United States Patent [19]
Hattori et al.

[11] Patent Number: 5,258,885
[45] Date of Patent: Nov. 2, 1993

[54] DIGITAL PROTECTIVE RELAY APPARATUS

[75] Inventors: Masahiro Hattori; Junichi Inagaki, both of Tokyo, Japan

[73] Assignee: Kabushiki Kaisha Toshiba, Kawasaki, Japan

[21] Appl. No.: 797,193

[22] Filed: Nov. 25, 1991

[30] Foreign Application Priority Data

Nov. 30, 1990 [JP] Japan .................................. 2-340240

[51] Int. Cl.$^5$ ............................................. H02H 3/05
[52] U.S. Cl. ...................................... 361/79; 361/88; 361/93
[58] Field of Search ...................... 361/93, 42, 79, 80, 361/86, 87, 102, 111, 88; 307/137

[56] References Cited

U.S. PATENT DOCUMENTS 4,441,136  4/1984  Hampshire ............................ 361/88
4,709,295  11/1987  Yamaura et al. ....................... 361/80

FOREIGN PATENT DOCUMENTS 60-226716  11/1985  Japan .

Primary Examiner—A. D. Pellinen
Assistant Examiner—Ronald W. Leja
Attorney, Agent, or Firm—Oblon, Spivak, McClelland, Maier & Neustadt

[57] ABSTRACT

A digital protective relay apparatus for protecting a power system comprises an accident determination section for determining an accident in the power system, which receives a voltage and a current of the power system from the power system to determine an accident in the power system using the voltage and the current, outputs a determination signal indicating the presence/absence of an accident in accordance with a result of the accident determination, and outputs a first trip signal upon detecting an accident in the power system in accordance with the accident determination, a protection sequence section for receiving the determination signal from the accident determination section to determine necessity of a trip output by performing predetermined sequence processing using the determination signal, and outputting a second trip signal upon obtaining a determination result indicating that a trip command is to be output, and a trip generator for generating, when both of the first and second trip signals are output, a third trip signal for opening a circuit breaker provided to protect the power system.

14 Claims, 11 Drawing Sheets

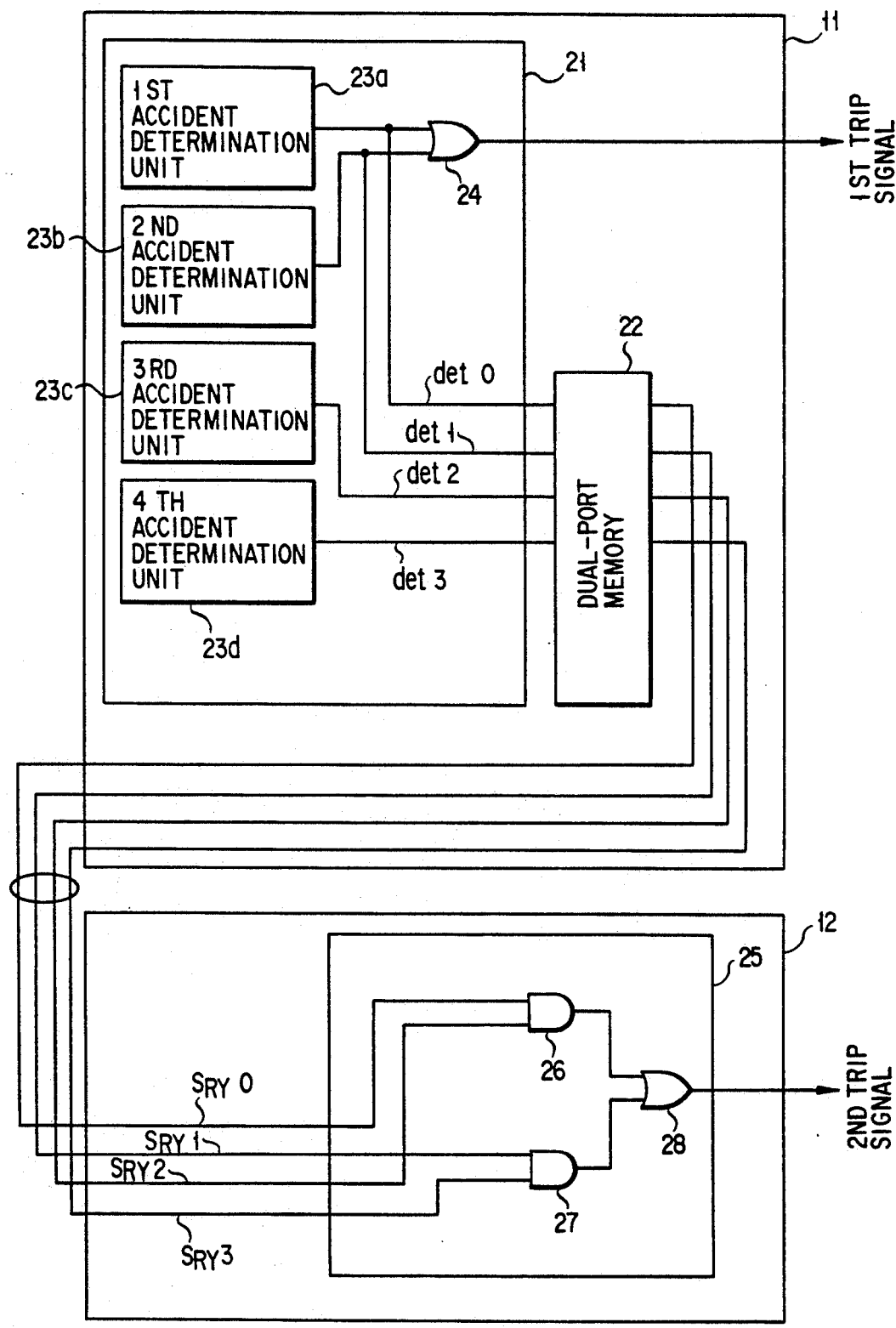
F I G. 2

|bit3|bit2|bit1|bit0|
|---|---|---|---|
|1|0|0|1|
|(det 3)|(det 2)|(det 1)|(det 0)|

F I G. 7A

|bit13|bit12|bit11|bit10|
|---|---|---|---|
|0|0|1|1|
|(det 2)|(det 1)|(det 0)|(det 3)|

F I G. 7B

|bit3|bit2|bit1|bit0|
|---|---|---|---|
|1|0|0|1|
|(det 3)|(det 2)|(det 1)|(det 0)|

F I G. 8A

|bit25|bit24|bit23|bit22|bit21|bit20|bit19|bit18|bit17|bit16|bit15|bit14|bit13|bit12|bit11|bit10|
|---|---|---|---|---|---|---|---|---|---|---|---|---|---|---|---|
|0|0|0|0|0|0|0|0|1|0|0|0|0|0|0|0|

F I G. 8B

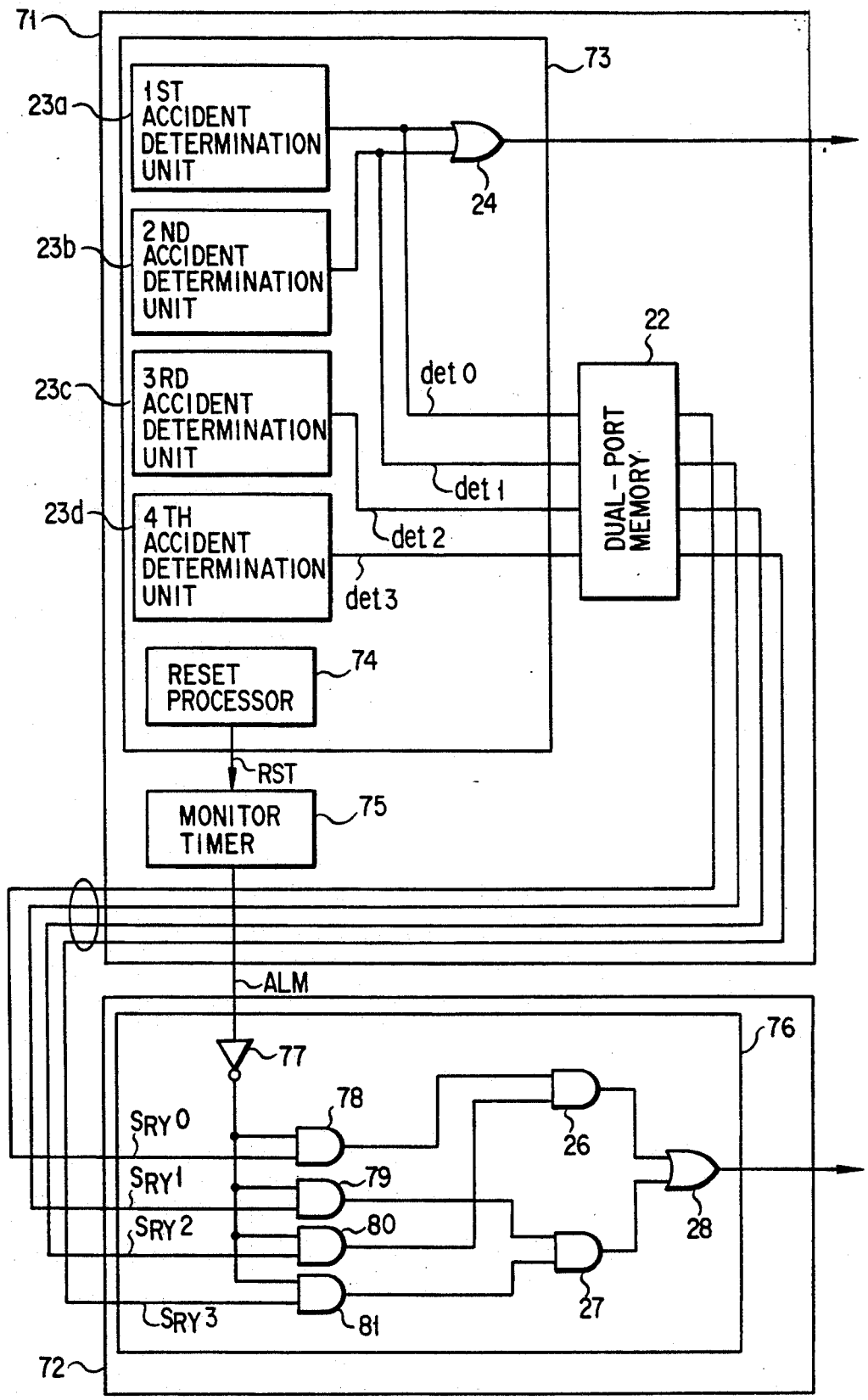
F I G. 9

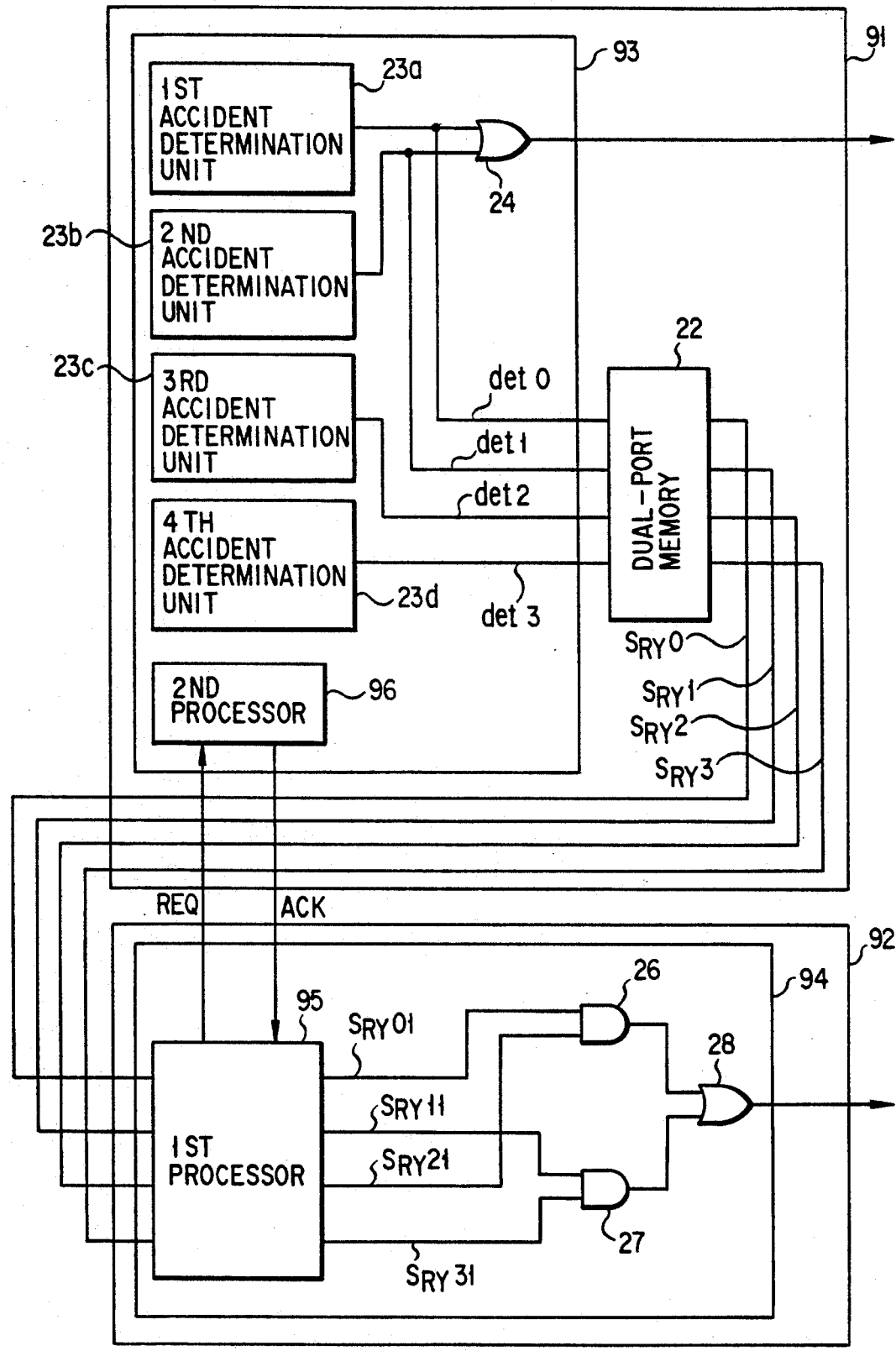
F I G. 10

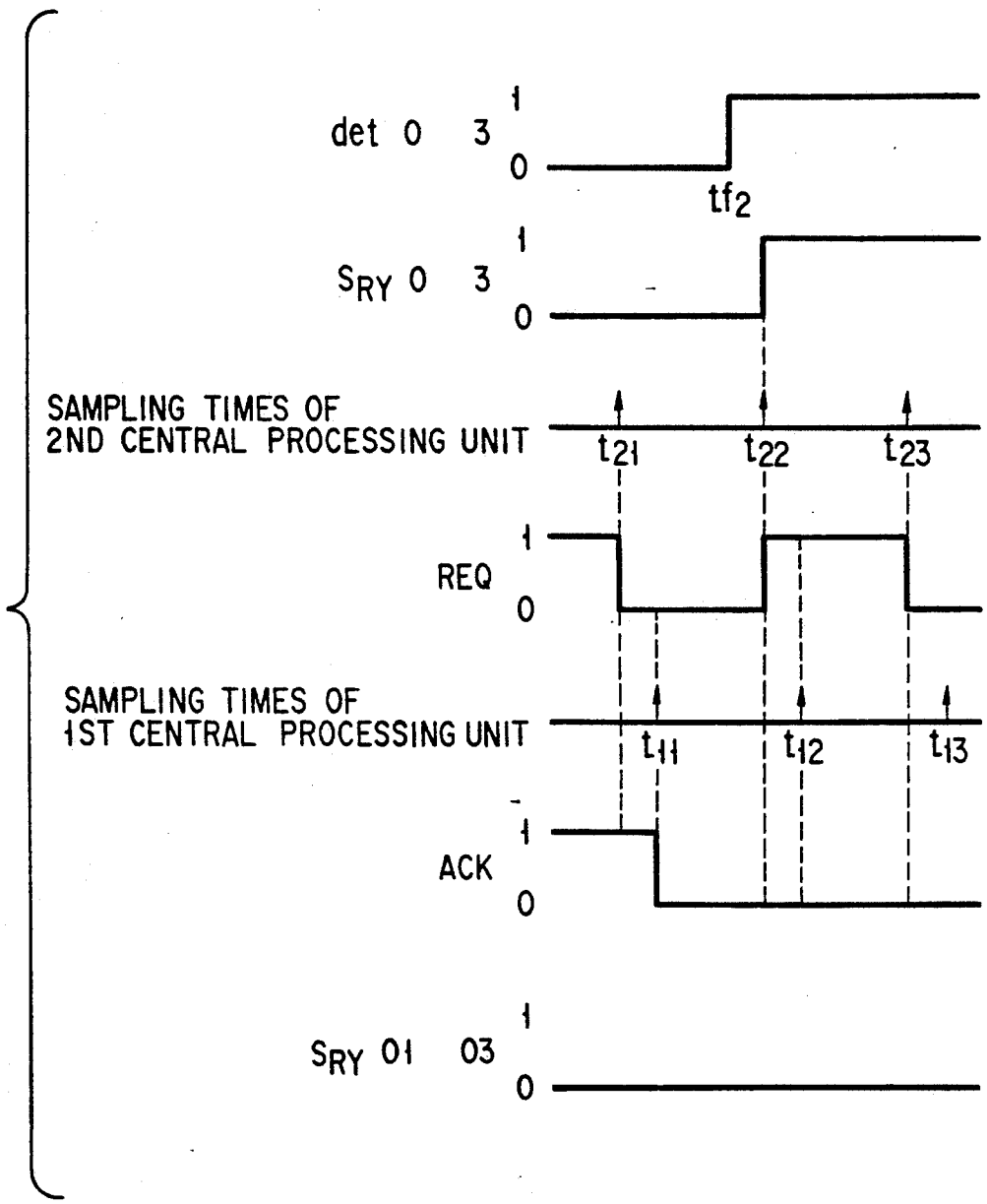
F I G. 12

DIGITAL PROTECTIVE RELAY APPARATUS

BACKGROUND OF THE INVENTION

1. Field of the Invention

The present invention relates to a digital protective relay apparatus which realizes an accident determination section and a protection sequence section by an arithmetic operation of a digital processing unit such as a microprocessor.

2. Description of the Related Art

A malfunction of a digital protective relay apparatus for protecting a power system has a large influence on the power system and causes system down in the worst case. Therefore, a protective relay apparatus is required to have very high reliability.

The internal arrangement of a conventional digital protective relay apparatus is separated into a main detecting unit and a fail-safe unit. In most conventional apparatuses of this type, the main detecting unit and the fail-safe unit have each an accident determination section and a protection sequence section. A protective relay apparatus of this type is designed to output a trip command to a circuit breaker if trip outputs are generated by the protection sequence sections of the main detecting unit and the fail-safe unit.

FIG. 13 shows a practical arrangement of the conventional digital protective relay apparatus as described above. Referring to FIG. 13, reference numeral 1 denotes an accident determination section of a main detecting unit, and reference numeral 2 denotes its protection sequence section. The protection sequence section 2 receives an accident determination signal $S_{RY}$ obtained by the accident determination section 1, determines necessity of a trip output by predetermined sequence processing, and outputs a trip command as needed. Reference numeral 4 denotes a contact driver which receives a result signal indicating a logic operation result of the protection sequence section 2 and operates a contact circuit 6 in accordance with the result signal; 7, a fail-safe unit including an accident determination section and a protection sequence section for fail safe; and 8, a contact driver which receives an accident determination signal obtained by the accident determination section in the fail-safe unit 7 and operates a contact circuit 9 connected in series with the contact circuit 6 in accordance with the determination signal. When both of the contact circuits 6 and 9 are closed, a trip command Scb is output to a circuit breaker (not shown) provided in a power system.

Assume that in the digital protective relay apparatus having the above arrangement, although no accident occurs in a power system, the accident determination section 1 supplies the signal $S_{RY}$ indicating occurrence of an accident to the protection sequence section 2 due to a failure in the accident determination section 1. Therefore, a false operation command is supplied to the contact circuit 6, though the protection sequence section 2 and the contact driver 4 are normal. As a result, the contact circuit 6 is closed.

Since, however, no accident has actually occurred in the power system, the fail-safe unit 7 does not operate. Therefore, the contact circuit 9 is not closed because no operation signal is supplied to the contact driver 8.

According to the arrangement shown in FIG. 13, therefore, even if the contact circuit 6 is erroneously closed due to a failure in the accident determination section 1, a false trip command Scb is not supplied to the circuit breaker because the contact circuit 9 is not closed.

Similarly, even when the protection sequence section 2 or the contact driver 4 fails, a false trip command Scb is not supplied to the circuit breaker (not shown) if the fail-safe unit 7, the contact driver 8, and the contact circuit 9 have not failed.

Even when any of the fail-safe unit 7, the contact driver 8, and the contact circuit 9 fails and the contact circuit 9 is closed, since the contact circuit 6 is not closed if none of the accident determination section 1, the protection sequence section 2, the contact driver 4, and the contact circuit 6 have failed, a false trip command Scb is not supplied to the circuit breaker.

The above digital protective relay apparatus, however, must comprise the fail-safe unit having the accident determination section and the protection sequence section in order to increase its reliability. Therefore, the scale of the apparatus is increased to result in an expensive apparatus.

On the other hand, a digital protective relay apparatus constituted by only a main detecting unit is also available.

FIG. 14 shows a practical arrangement of a digital protective relay apparatus of this type. The apparatus shown in FIG. 14 is the same as that shown in FIG. 13 in arrangements of an accident determination section 1, a protection sequence section 2, a contact driver 4, and a contact circuit 6 but no fail-safe unit is used in the apparatus shown in FIG. 14.

In this protective relay apparatus, if one of the accident determination section 1, the protection sequence section 2, and the contact driver 4 fails, a false operation command is output to the contact circuit 6. In addition, since no section corresponding to the fail-safe unit shown in FIG. 13 is present, a false trip command Scb is directly output to a circuit breaker if the contact circuit 6 is closed. As described above, the false trip command Scb has an influence on a power system and causes system down in the worst case.

SUMMARY OF THE INVENTION

It is an object of the present invention to provide a digital protective relay apparatus capable of omitting a fail-safe unit and preventing sending of a false trip command to a circuit breaker, thereby decreasing the size of the apparatus to realize cost reduction.

In order to achieve the above object, a digital protective ready apparatus according to the present invention comprises a accident determination section for determining an accident in the power system, which receives a voltage and a current of the power system from the power system to determine an accident in the power system using the voltage and the current, outputs a determination signal indicating presence/absence of an accident in accordance with a result of the accident determination, and outputs a first trip signal upon detecting an accident in the power system in accordance with the accident determination, a protection sequence section for receiving the determination signal from the accident determination section to determine necessity of a trip output by performing predetermined sequence processing using the determination signal, and outputting a second trip signal upon obtaining a determination result indicating that a trip command is to be output, and a trip generator for generating, when both of the first and second trip signals are output, a third trip signal for opening a circuit breaker provided to protect the power system.

In the digital protective relay apparatus having the above arrangement, only when both accident determination section and the protection sequence section output the first and second trip signals, the trip generator generates the third trip signal for opening the circuit breaker. Therefore, even if the second trip signal is erroneously output due to a failure in the protection sequence section, the accident determination section which normally operates does not output the first trip signal. On the contrary, even if the first trip signal is erroneously output due to a failure in the accident determination section, the protection sequence section which normally operates does not output the second trip signal. As a result, no false trip command is output to the circuit breaker provided to protect the power system.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a functional block diagram showing an internal arrangement of the first embodiment in detail;

FIGS. 7A and 7B are views for explaining coding processing in the third embodiment;

FIGS. 8A and 8B are views for explaining another coding processing in the third embodiment;

FIG. 9 is a block diagram showing an arrangement of a digital protective relay apparatus according to the fourth embodiment of the present invention;

FIG. 10 is a block diagram showing an arrangement of a digital protective relay apparatus according to the fifth embodiment of the present invention;

FIG. 12 is a timing chart showing operation timings upon occurrence of an accident in the fifth embodiment;

DETAILED DESCRIPTION OF THE PREFERRED EMBODIMENTS

Embodiments of the present invention will be described below.

Figure 1:
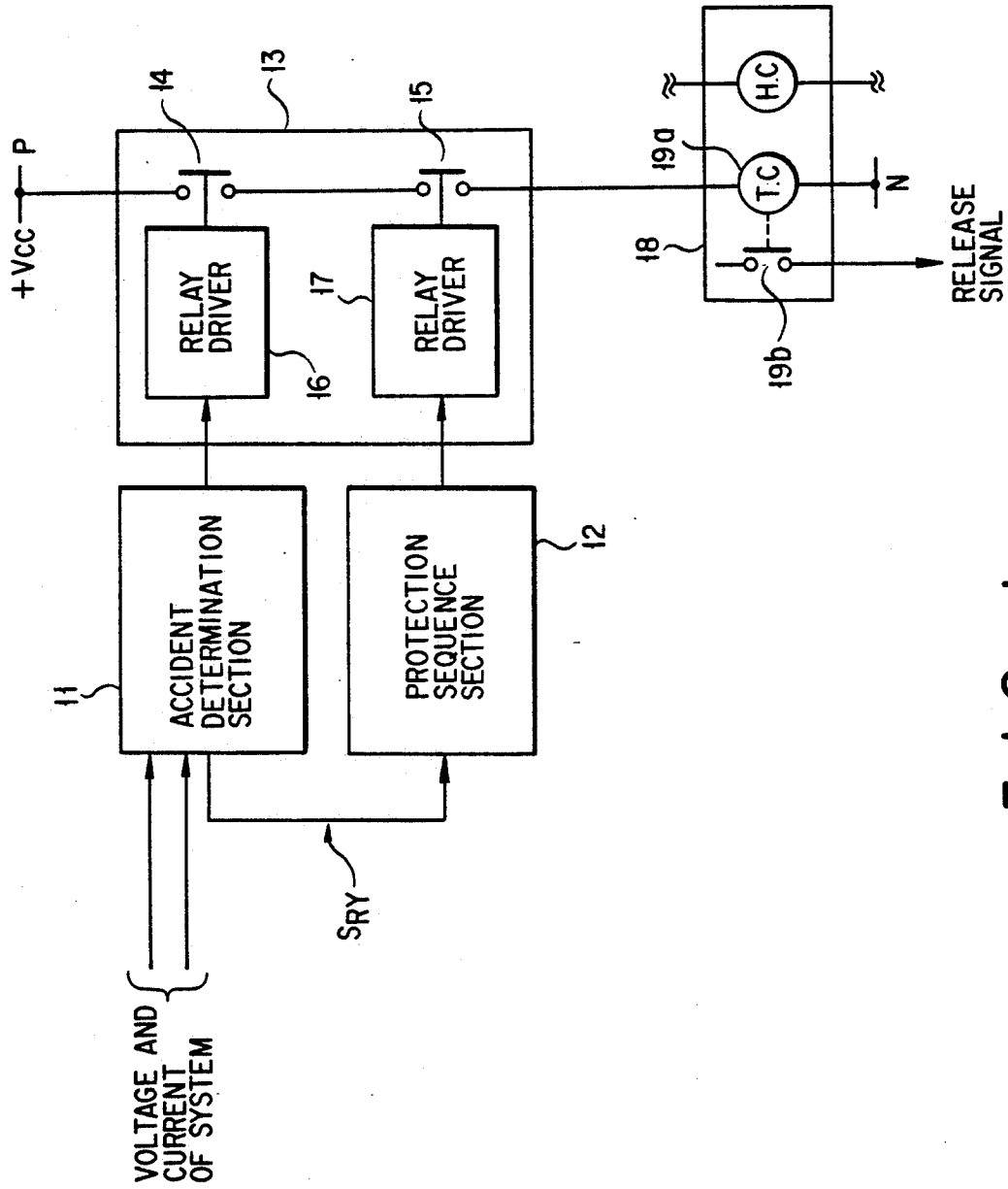
FIG. 1 is a block diagram showing an arrangement of a digital protective relay apparatus according to the first embodiment of the present invention.

FIG. 1 shows a digital protective relay apparatus according to the first embodiment of the present invention.

This digital protective relay apparatus comprises an accident determination section 11 for receiving a voltage and a current from a power system to perform accident determination for the power system, a protection sequence section 12 for receiving an accident determination result from the accident determination section 11 to perform trip determination, and a trip relay circuit 13 for generating a third trip signal indicating a trip command upon receiving first and second trip signals from the accident determination section 11 and the protection sequence section 12 at the same time.

The accident determination section 11 determines various accidents in accordance with the states of the voltage and the current from the power system and outputs a determination signal $S_{RY}$ indicating the presence/absence of an accident each time it performs accident determination. In addition, the accident determination section 11 outputs the first trip signal to the trip relay circuit 13 when a predetermined accident determination signal indicates occurrence of an accident.

The protection sequence section 12 receives a determination signal $S_{RY}$ from the accident determination section 11 and checks by performing predetermined sequence processing whether a trip command is to be output. If the protection sequence section 12 determines that a trip command is to be output, it outputs the second trip signal to the trip relay circuit 13.

The trip relay circuit 13 comprises first and second normally-open contact circuits 14 and 15 inserted in series with each other in a line connecting a power line P and a ground line N, a first contact driver 16 for receiving the first trip signal output from the accident determination section 11 to turn on the first normally-open contact circuit 14, and second contact driver 17 for receiving the second trip signal output from the protection sequence section 12 to turn on the second normally-open contact circuit 15.

A circuit breaker (not shown) provided in the power system is operated by a circuit breaker operating unit 18. The unit 18 has a release coil 19a arranged in series with the first and second normally-open contact circuits 14 and 15 between the power line P and the ground line N. When the first and second normally-open contact circuits 14 and 15 are closed to flow the third trip signal, the release coil 19a is excited to turn on a corresponding relay contact 19b, thereby outputting a release signal to the circuit breaker.

The arrangements of the accident determination section 11 and the protection sequence section 12 will be described in detail below with reference to FIG. 2 by taking a distance relay apparatus as an example.

The accident determination section 11 has a first central processing unit 21 for performing arithmetic operations concerning determination of a plurality of types of accidents, and a dual-port memory 22 for receiving and storing determination results (determination signals det0 to det3) obtained by the first central processing unit 21 from its one input port.

The first central processing unit 21 has first to fourth accident determination units 23a to 23d for performing determination of different types of accidents of the power system, and an OR circuit 24 for receiving determination signals from the first and second accident determination units 23a and 23b and outputting a first trip signal if one of the determination signals indicates occurrence of an accident.

In this embodiment, the first accident determination unit 23a is an undervoltage relay element which receives a line voltage value of the power system and operates when the voltage value is a predetermined reference or less. The second accident determination unit 23b is an overcurrent relay element which receives a zero-phase current of the power system and operates when the current value is a predetermined value or more. The third accident determination element 23c is a short-circuit distance relay element which receives a line voltage value and a current value of the power system to arithmetically operate the impedance of the system and operates when the impedance value is a predetermined reference or less. The fourth accident determination element 23d is a ground distance relay element which receives voltage and current values of each phase and a current value of a zero phase of the system to arithmetically operate the impedance of the system and operates when the impedance value is a predetermined reference or less.

Figure 3:
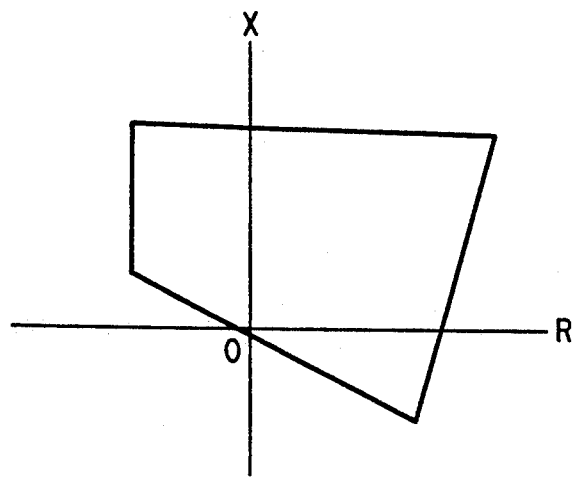
FIG. 3 is a graph showing characteristics of a distance relay element shown in FIG. 2.

For example, when characteristics of the distance relay element are set as shown in FIG. 3, a region specified by the quadrilateral is an accident determination range.

Figure 4:
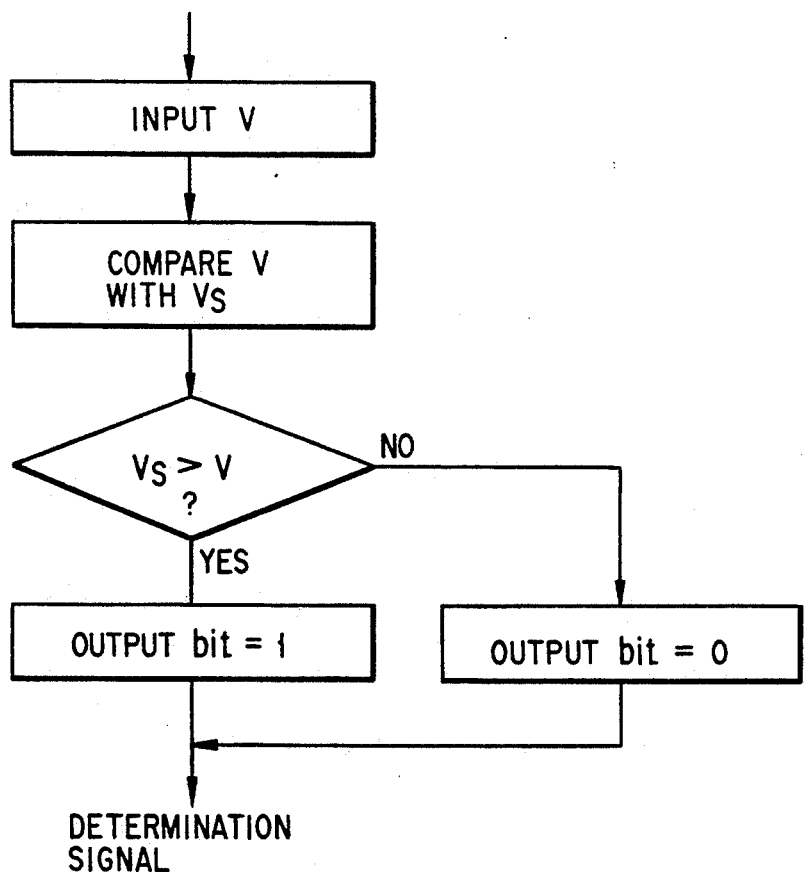
FIG. 4 is a flow chart showing an accident determination operation of a first accident determination unit shown in FIG. 2.

In this embodiment, the determination signal indicates the presence/absence of an accident by data of "1" or "0". For example, the first accident determination unit 23a as a distance relay element receives a line voltage V and compares the voltage V with a predetermined voltage reference Vs, as shown in FIG. 4. If the line voltage V is larger than the reference Vs, the first accident determination unit 23a outputs bit data of "0" as the determination signal. If the voltage V is smaller than the Vs, the unit 23a outputs bit data of "1" which indicates occurrence of an accident.

The OR circuit 24 OR-operates the output from the first accident determination unit 23a as the undervoltage relay element and the output from the second accident determination section 23b as the overcurrent relay element and outputs the first trip signal.

The protection sequence section 12, on the other hand, has a second central processing unit 25 for performing arithmetic operations of a protection sequence. The second central processing unit 25 is constituted by AND circuits 26 and 27 and an OR circuit 28.

The AND circuit 26 AND-operates signals $S_{RY}0$ and $S_{RY}2$ corresponding to the determination signals det0 and det2 stored in the dual-port memory 22 to detect a short-circuit accident. Similarly, the AND circuit 27 ANDs signals $S_{RY}1$ and $S_{RY}3$ corresponding to the determination signals det1 and det3 stored in the dual-port memory 22 to detect a ground accident. The OR circuit 28 ORs output signals from the AND circuits 26 and 27 to output the second trip signal.

Note that the dual-port memory 22 of the first central processing unit 21 is connected to the AND circuits 26 and 27 of the second central processing unit 25 through a system bus.

The digital protective relay apparatus having the above arrangement provides the following functions.

Assume that although no accident has occurred in the power system, the second trip signal is supplied to the second contact driver 17 due to a failure of the protection sequence section 12. In this case, a false operation command is supplied to the second contact circuit 15 even if the second contact driver 17 is normal.

Since, however, the accident determination section 11 does not generate the first trip signal if no accident occurs in the power system, the first trip signal is not supplied to the first contact driver 16, and the first contact circuit 14 is not closed. Therefore, even when the second contact circuit 15 is erroneously closed due to a failure of the protection sequence section 12, a false trip command $S_{CB}$ is not output to the circuit breaker operating unit 18 because the first contact circuit 14 is not closed.

Similarly, even when the second contact driver 17 or the second contact circuit 15 fails, no false trip command is output to the circuit breaker operating unit 18 as long as the accident determination section 11, the first contact driver 16, and the first contact circuit 14 are normal. Even when the first contact circuit 14 is closed due to a failure in the accident determination section 11, the first contact driver 16 or the first contact circuit 14, the second contact circuit 15 is not closed as long as the protection sequence section 12, the second contact driver 17, and the second contact circuit 15 are normal. Therefore, no false trip command is supplied to the circuit breaker operating unit 18. As a result, a malfunction of the circuit breaker caused by a failure in the accident determination section 11 or the protection sequence section 12 can be prevented.

The following four cases can be assumed as states obtained when the accident determination section 11 fails.

(1) The first one is a case wherein both of the first trip signal output from the accident determination section 11 and the determination signal $S_{RY}$ input to the protection sequence section 12 go to "0". In this case, since the first and second contact circuits 14 and 15 are open, no false trip command is output to the circuit breaker operating unit 18 to erroneously open the circuit breaker.

(2) The second one is the case wherein the first trip signal output from the accident determination section 11 goes to "0" and the determination signal $S_{RY}$ input to the protection sequence section 12 goes to "1." In this case, the second contact circuit 15 is closed even if none of the protection sequence section 12, the second contact driver 17, and the second contact circuit 15 have failed. However, since the first contact circuit 14 is open, no false trip command is output to the circuit breaker operating unit 18.

(3) The third one is a case wherein the first trip signal output from the accident determination section 11 goes to "1" and the determination signal $S_{RY}$ input to the protection sequence section 12 goes to "0". In this case, since the second contact circuit 15 is not closed as long as the protection sequence section 12, the second contact driver 17, and the second contact circuit 15 are normal, no false trip command is output to the circuit breaker operating unit 18.

(4) The fourth and last one is a case wherein both of the first trip signal output from the accident determination section 11 and the determination signal $S_{RY}$ input to the protection sequence section 12 go to "1". In this case, the second contact circuit 15 is closed even if none of the protection sequence section 12, the second contact driver 17, and the second contact circuit 15 have failed, and the first contact circuit 14 is also closed. Therefore, a false trip command is output to the circuit breaker operating unit 18.

Figure 14:
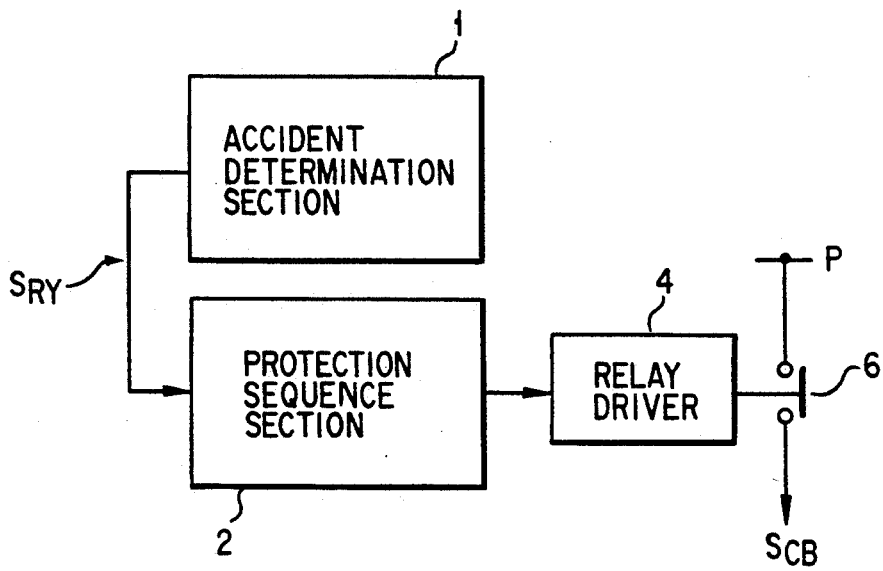
FIG. 14 is a block diagram showing an arrangement of a conventional digital protective relay apparatus from which a fail-safe unit is omitted.

In this embodiment, as described above, a false trip command is output to the circuit breaker due to a failure of the accident determination section 11 in only one out of the four failure modes. Therefore, a probability that a false trip command is output is lower than that in the conventional arrangement shown in FIG. 14 having no fail-safe unit.

In this embodiment, when the protective relay apparatus is a distance relay having the arrangement shown in FIG. 2, a plurality of determinations signals $S_{RY}0$ to $S_{RY}3$ are supplied from the accident determina-tion sections 11 to the protection sequence section 12. Therefore, a failure mode is limited to a case wherein both of the determination signals $S_{RY}0$ and $S_{RY}2$ go to "1" while the first trip signal is "1", or a case wherein both of the determination signals $S_{RY}1$ and $S_{RY}3$ go to "1" while the first trip signal is "1". As a result, a probability that a false trip command is output to the circuit breaker operating unit due to a failure in the accident determination section 11 can be further decreased.

The second embodiment of the present invention will be described below.

In this embodiment, the accident determination section and the protection sequence section of the protective relay apparatus shown in FIG. 1 are modified.

Figure 5:
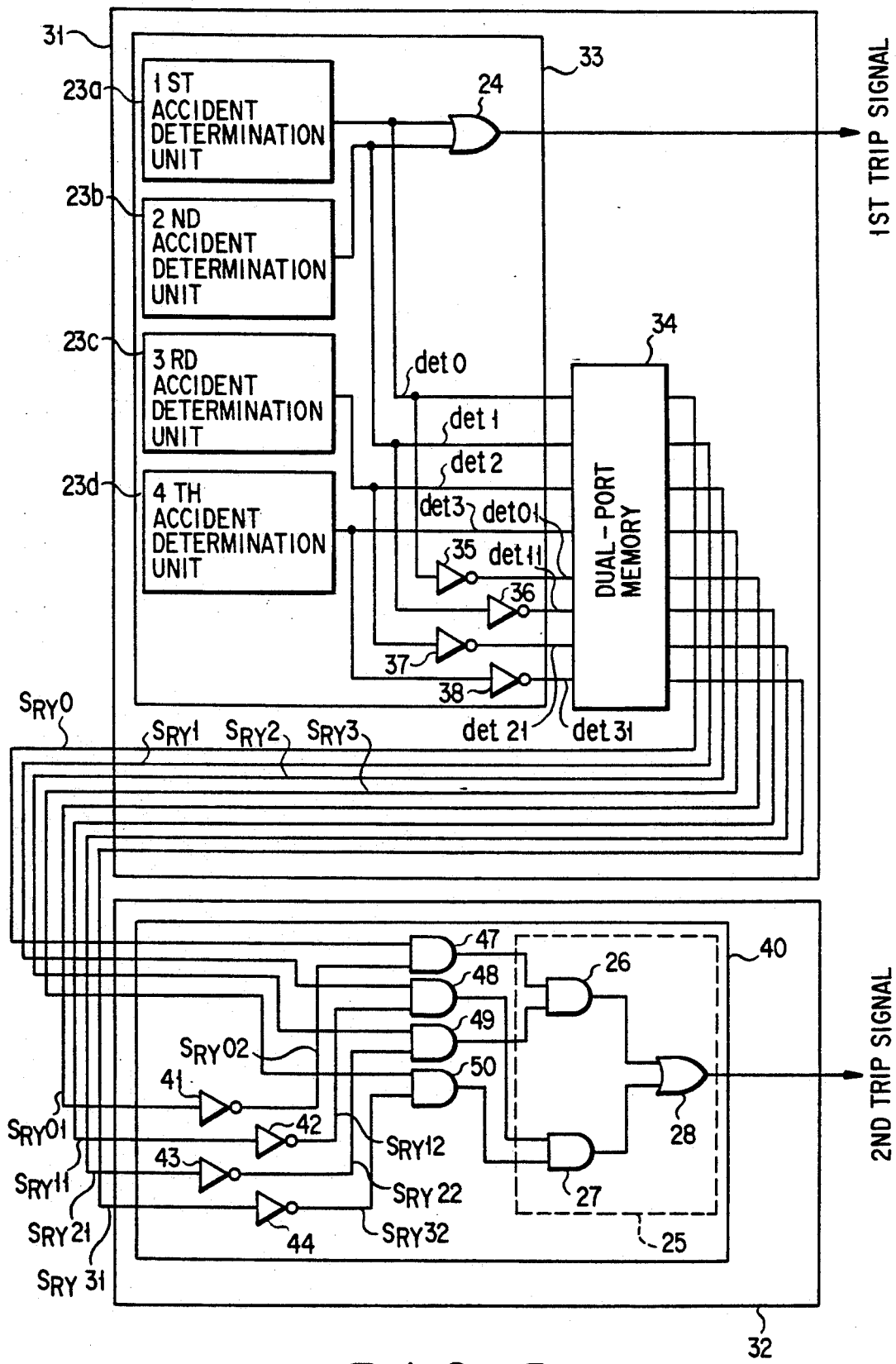
FIG. 5 is a block diagram showing an arrangement of a digital protective relay apparatus according to the second embodiment of the present invention.

FIG. 5 shows practical arrangements of an accident determination section 31 and a protection sequence section 32 of the second embodiment. The same parts as in FIG. 2 are denoted by the same reference numerals in FIG. 5 to omit a detailed description thereof, and only a difference between the two embodiments will be described below.

The accident determination section 31 has a first central processing unit 33 and a dual-port memory 34. The first central processing unit 33 includes inverting units 35 to 38 for inverting determination signals det0 to det3 output from first to fourth accident determination units 23a to 23d and storing them as signals det01 to det31 in the dual-port memory 34.

Signals $S_{RY}01$ to $S_{RY}31$ read out from the other port of the dual-port memory 34 in correspondence with the inverted signals det01 to det31 are supplied to the protection sequence section 32.

The protection sequence section 32 has a second central processing unit 40. The second central processing unit 40 has inverting units 41 to 44 for inverting the signals $S_{RY}01$ to $S_{RY}31$, and AND circuits 47 to 50 for ANDing inverted signals $S_{RY}02$ to $S_{RY}32$ from the inverting units 41 to 44 and the signals det0 to det3 input from the dual-port memory 34 (for each signal corresponding to the first to fourth accident determination units 23a to 23d). Outputs from the AND circuits 47 and 49 are supplied to an AND circuit 26, and those from the AND circuits 48 and 50 are supplied to an AND circuit 27.

The inverted signals $S_{RY}02$ and $S_{RY}22$ from the inverting units 41 and 43 are input to the AND circuit 26 the output from this circuit 26 shows that a short circuit has occurred. The inverted signals $S_{RY}12$ and $S_{RY}32$ from the inverting units 42 and 44 are input to the AND circuit 27. The output of this circuit 27 shows that grounding has occurred.

Assume that in this digital protective relay apparatus, all of a first trip signal, the determination signals det0 to det3 output from the dual-port memory 34, and the outputs det01 to det31 from the inverting units 35 to 38 go to "1" due to a failure in the first central processing unit 33.

In this case, since an OR circuit 24 supplies the first trip signal to a first contact driver 16, a first contact circuit 14 is closed. At the same time, the signals det0 to det3 from the accident determination section 31 to the protection sequence section 32 go to "1".

Since, however, the signals det01 to det31 from the inverting units 35 to 38 are "1", the signals $S_{RY}01$ to $S_{RY}31$ to the protection sequence section 32 also go to "1". If the second processing unit 40 has not failed, since the signals $S_{RY}02$ to $S_{RY}32$ go to "0" by inverting processing of the inverting units 41 to 44, outputs from the AND circuits 47 to 50 go to "0".

The outputs from the AND circuits 26 and 27, therefore, go to "0", and the output from the OR circuit 28 also goes to "0". As a result, since the second trip signal is not supplied to a second contact driver 17 and a second contact circuit 15, no false trip command is supplied to a circuit breaker operating unit 18.

In the above arrangement, a trip command is erroneously output only when the first and third accident determination units 23a and 23c fail in determination processing and the inverting units 35 and 37 fail, or when the second and fourth accident determination units 23b and 23d fail in determination processing and the inverting units 36 and 38 fail. Such a failure occurs at a very low probability.

The third embodiment of the present invention will be described below.

In this embodiment, the accident determination section and the protection sequence section of the protective relay apparatus shown in FIG. 5 are modified.

Figure 6:
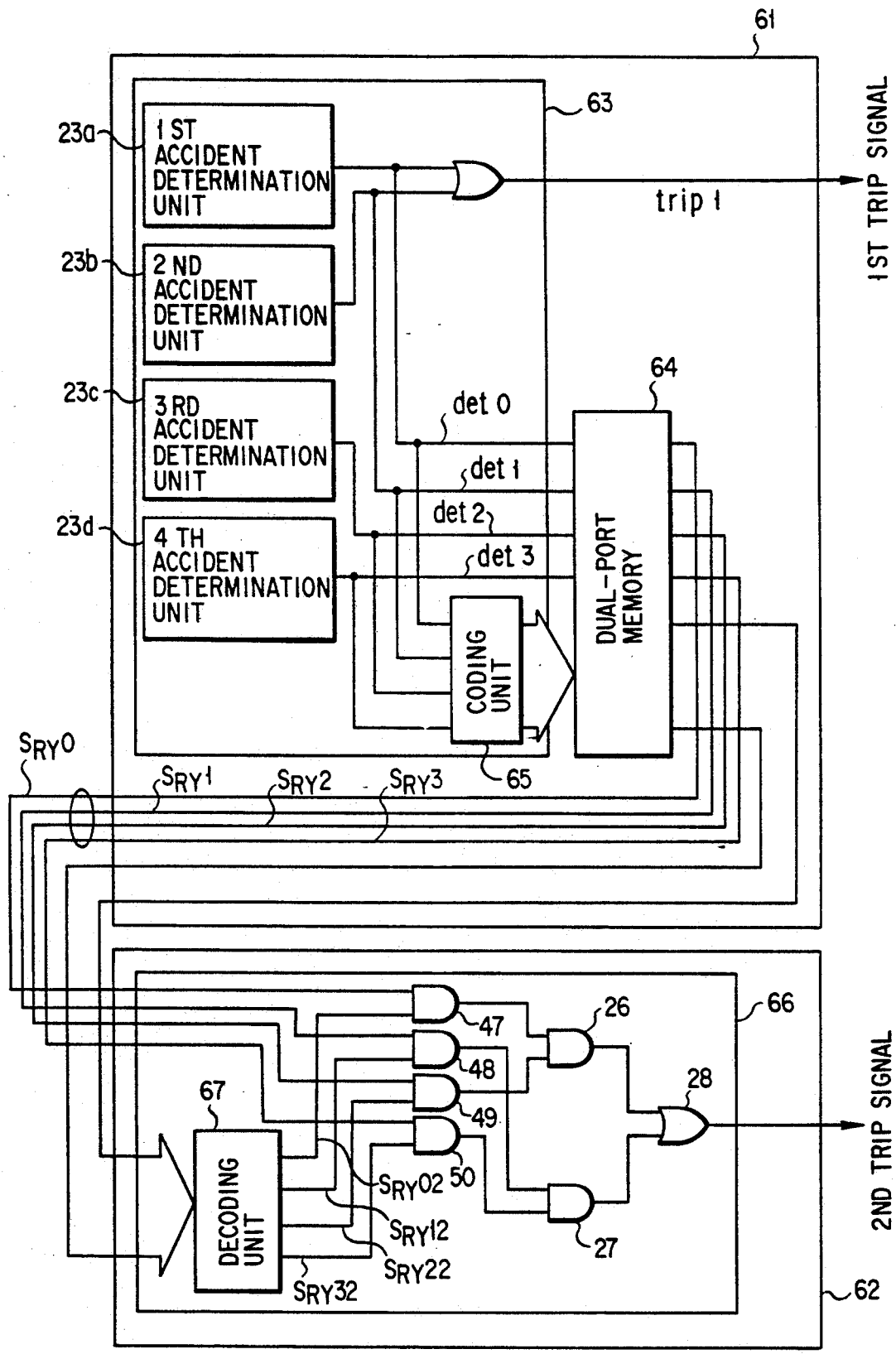
FIG. 6 is a block diagram showing an arrangement of a digital protective relay apparatus according to the third embodiment of the present invention.

FIG. 6 shows a practical arrangement of an accident determination section 61 and a protection sequence section 62 of the third embodiment. The same parts as in FIG. 5 are denoted by the same reference numerals in FIG. 6 to omit a detailed description thereof and only a difference between the two embodiments will be described below.

A first central processing unit 63 of the accident determination section 61 has a coding unit 65 for coding determination signals det0 to det3 from first to fourth accident determination units 23a to 23d and storing the coded signals in a dual-port memory 64.

A second central processing unit 66 of the protection sequence section 62 has a decoding unit 67 for decoding the signals coded by the coding unit 65. Decoded signals $S_{RY}02$ to $S_{RY}32$ are input to AND processors 47 to 50.

The AND circuits 47 to 50 AND the signals $S_{RY}02$ to $S_{RY}32$ and signals $S_{RY}0$ to $S_{RY}3$ output from the dual-port memory 64 of the first central processing unit 63 in one-to-one correspondence with the output signals det0 to det3 from the accident determination units 23a to 23d. Outputs from the AND circuits 47 and 49 are supplied to an AND circuit 26, and those from the AND circuits 48 and 50 are supplied to an AND circuit 27.

FIGS. 7A and 7B show examples of coding performed by the coding unit 65, in which FIG. 7A shows the state of signals before coding, and FIG. 7B shows that after coding.

Referring to FIG. 7A, bit0 to bit3 correspond to the outputs det0 to det3 from the first to fourth accident determination units 23a to 23d, in which "1" indicates an operative state and "0" indicates a reset state.

The coding unit 65 shifts this signal state to the left on the drawing surface by one bit and moves a signal originally present at the left end to the right end. That is, the coding unit 65 performs so-called rotation. As a result, as shown in FIG. 7B, bit10 corresponds to the output det3 from the fourth accident determination unit 23d, and bit11 to bit13 correspond to the outputs det0 to det2 from the first to third accident determination units 23a to 23c.

The decoding unit 67 performs processing of returning signals coded as shown in FIG. 7B into their original form as shown in FIG. 7A.

Assume that in the digital protective relay apparatus having the above arrangement, the first central processing unit 63 fails and over-run to output the first trip signal although no accident has occurred in a power system. In this case, a first contact circuit 14 is closed.

Even if, however, any one of the determination signals from the first to fourth accident determination units 23a to 23d indicates occurrence of an accident, since the processing function of the coding unit 65 of the failed first central processing unit 63 is also lost, the processing results $S_{RY}02$ to $S_{RY}32$ of the decoding unit 67 do not coincide with the signals $S_{RY}0$ to $S_{RY}3$. The outputs from the AND circuits 47 to 50 go to "0". Therefore, since the outputs from the AND circuits 26 and 27 and an OR circuit 28 also go to "0", a contact driver 17 does not operate and a second contact circuit 15 remains open. Therefore, no false trip command is output to a circuit breaker operating unit 18 due to the failure in the first central processing unit 63.

Note that various methods can be adopted as coding. FIGS. 8A and 8B show a modification of coding, in which FIG. 8A shows the state of signals before coding in correspondence with FIG. 7A, and FIG. 8B shows that after coding. In this modification, the coding unit 65 determines that an input signal is a binary number, and outputs "1" in a bit position the number of which from a bit at the right end corresponds to the binary number. That is, since FIG. 8A represents "9" as a binary number, "1" is set in bit18 which is the ninth bit from the right end, as shown in FIG. 8B.

In a digital protective relay apparatus, a monitor timer, i.e., a so-called watch dog timer is often arranged separately from a central processing unit used in arithmetic operations to monitor the central processing unit.

In such an arrangement, the central processing unit normally resets the monitor timer once for each sampling by its arithmetic operation. If the arithmetic operation runs away due to a failure in the central processing unit, no reset pulse is output to the monitor timer. Therefore, the monitor timer counts up to output an alarm signal.

FIG. 9 shows an arrangement of a main part of the fourth embodiment using the present invention in a digital protective relay apparatus having the above arrangement. The reference numerals as in the accident determination section and the protective sequence section shown in FIG. 2 denote the same parts in FIG. 9.

In this embodiment, a reset processor 74 is incorporated in a first central processing unit 73 of an accident determination section 71. The reset processor 74 output a reset signal to a monitor timer 75 at a predetermined time interval (normally, once for each sampling).

Since a timer value longer than the predetermined time interval is preset in the monitor timer 75, the timer 75 is reset before count-up as long as a reset signal RST is output at the predetermined time interval. The monitor timer 75 sets a over-run detection signal ALM at "0" unless it counts up and sets the signal ALM at "1" when it does.

The over-run detection signal ALM, therefore, is "0" when the first central processing unit 73 does not fail and "1" when the unit fails.

A second central processing unit 76 of a protective sequence section 72 has an inverting unit 77 for inverting the logic level of the over-run detection signal ALM from the monitor timer 75. An output signal from the inverting unit 77 is supplied to AND circuits 78 to 81 for ANDing signals $S_{RY}0$ to $S_{RY}3$ and the inverted signal of the signal ALM.

Assume that in the digital protective relay apparatus having the above arrangement, the first central processing unit 73 fails and outputs a first trip signal although no accident has occurred in a power system, thereby closing a first contact circuit 14 and setting signals det0 to det3 at "1".

In this case, since the signal ALM goes to "1", an output from the inverting unit 77 goes to "0". Therefore, outputs from the AND circuit 78 to 81 go to "0", and outputs from AND circuits 26 and 27 and an OR circuit 28 also go to "0". As a result, since a contact driver 17 does not operate and a second contact circuit 15 remains open, no false trip command is output to a circuit breaker operating unit 18 due to the failure in the first central processing unit 73.

According to the arrangement shown in FIG. 9 as described above, sending of the false trip command can be reliably prevented.

A digital protective relay apparatus according to the fifth embodiment of the present invention will be described below with reference to FIG. 10. FIG. 10 shows arrangements of an accident determination section 91 and a protection sequence section 92 as main parts of this embodiment. The same reference numerals as in FIGS. 2 and 9 denote parts having the same functions in FIG. 10.

The accident determination section 91 has a first central processing unit 93, and the protection sequence section 92 has a second central processing unit 94.

The second central processing unit 94 has a first processor 95 for outputting a request signal for requesting data read to the first central processing unit 93. The first processor 95 can operate by virtue of the operation performed by the second central processing unit 94. The first central processing unit 93 has a second processor 96 for reading out the request signal from the first processor 95 to output an acknowledge signal. The second processor 96 can operate by virtue of the operation performed by the first central processing unit 93.

The first processor 95 outputs the request signal and receives the acknowledge signal. The processor 95 sets the request signal at "1" if the acknowledge signal is "0" and sets the request signal at "0" if the acknowledge signal is "1".

The first processor 95 also receives signals $S_{RY}0$ to $S_{RY}3$ corresponding to signals det0 to det3 output from a dual-port memory 22 of the first central processing unit 93.

In this case, if the state of the acknowledge signal coincides with that of the request signal when one operation time elapses after the first processor 95 outputs the request signal, the processor 95 receives the signals det0 to det3 from the dual-port memory 22 as the signals $S_{RY}0$ to $S_{RY}3$. If one of the output signals $S_{RY}0$ to $S_{RY}3$ is "1", the first processor 95 checks the states of the acknowledge and request signals again when one operation time elapses after the receipt of the signals $S_{RY}0$ to $S_{RY}3$. If the two signals coincide with each other, the processor 95 sets a corresponding one of outputs $S_{RY}01$ to $S_{RY}31$ at "1". If the two signals do not coincide with each other, the processor 95 sets all of the outputs $S_{RY}01$ to $S_{RY}31$ at "0".

The second processor 96 receives the request signal and outputs the acknowledge signal. The processor 96 sets the acknowledge signal at "0" if the request signal is "0" and sets the acknowledge signal at "1" if the request signal is "1".

Figure 11:
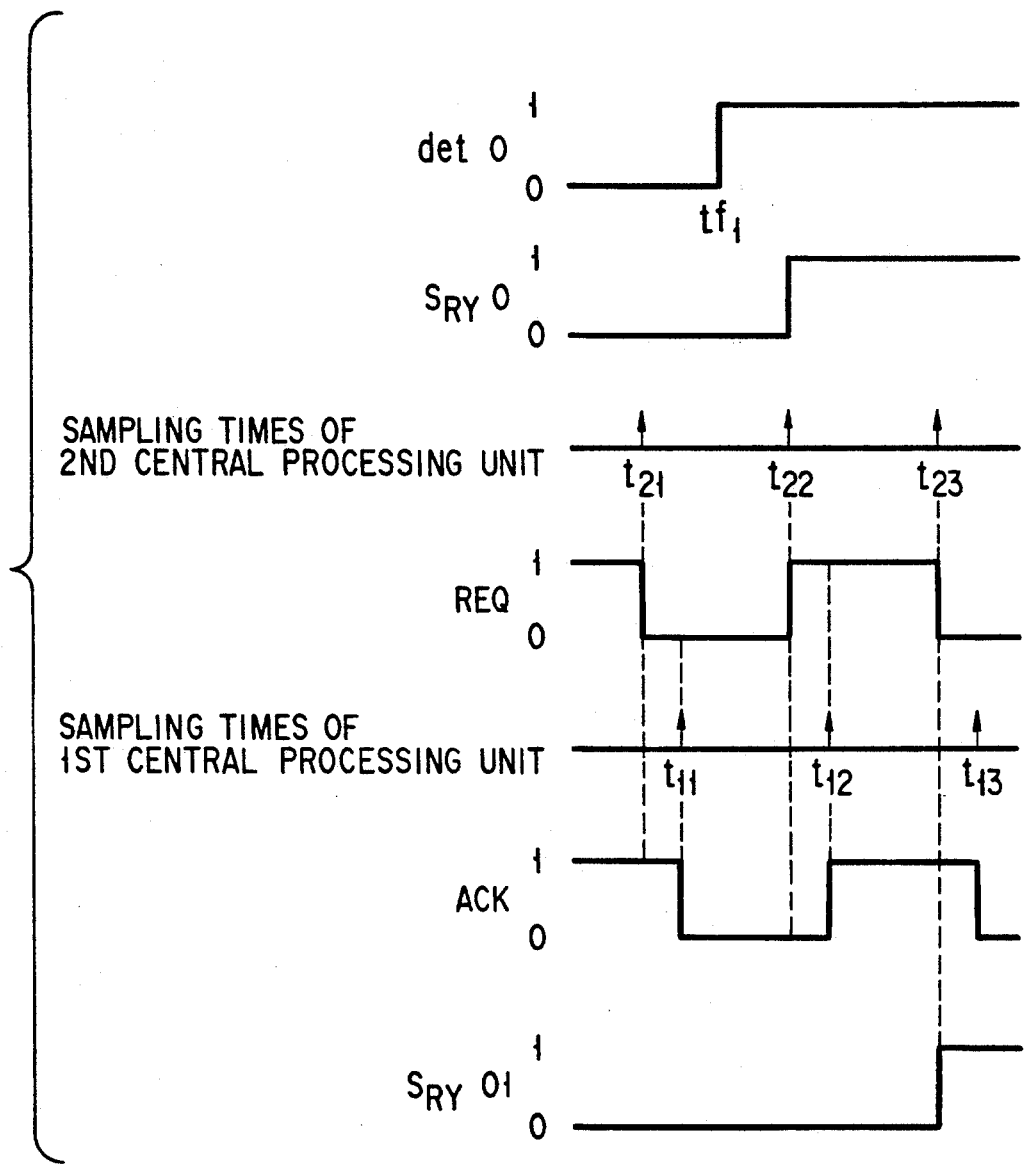
FIG. 11 is a timing chart showing operation timings during a normal operation in the fifth embodiment.
Figure 13:
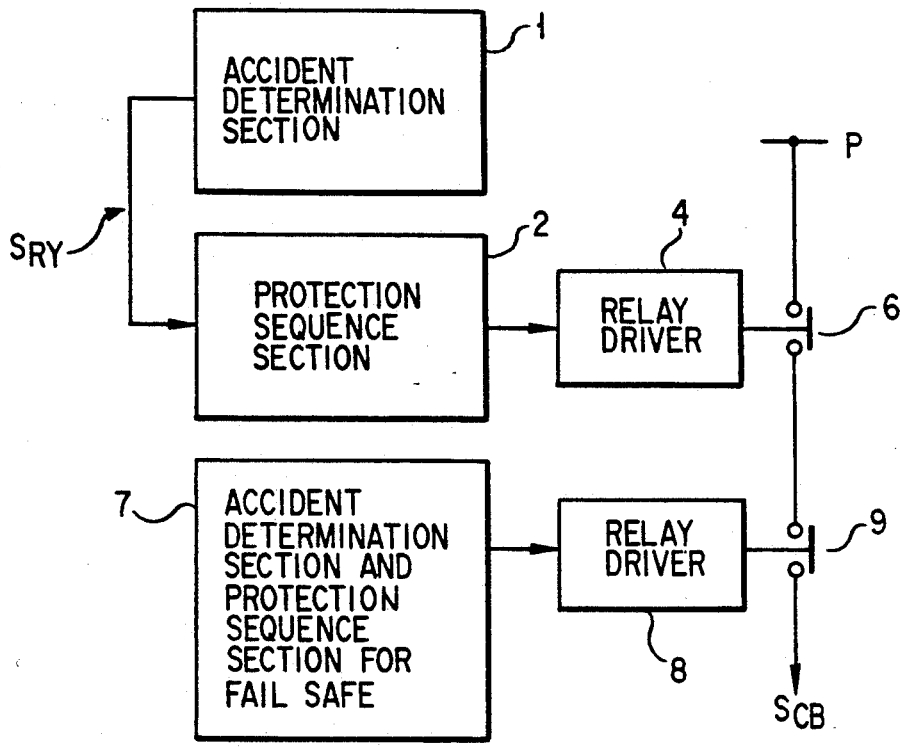
FIG. 13 is a block diagram showing an arrangement of a conventional digital protective relay apparatus.

Functions of the first and second processors 95 and 96 will be described in detail below with reference to a timing chart shown in FIG. 11. Referring to FIG. 11, $t_{21}$ to $t_{23}$ denote operation start times of the second central processing unit 94 and normally correspond to a sampling interval of input data, and $t_{11}$ to $t_{13}$ denote operation start times of the first central processing unit 93. Since the acknowledge signal ACK is "1" at the time $t_{21}$, the first processor 95 sets the request signal REQ at "0". Therefore, since both of the request and acknowledge signals go to "0" at the time $t_{22}$, the first processor 95 receives the signals det0 to det3 from the memory 22 as the signals $S_{RY}0$ to $S_{RY}3$.

In addition, since the acknowledge signal ACK is "0", the first processor 95 sets the request signal REQ at "1". Similarly, since the request signal REQ is "1" at the time t12, the second processor 96 sets the acknowledge signal ACK at "1".

Assume that the signal det0 goes to "1" at a time $t_{f1}$. In this case, the signal $S_{RY}0$ read out from the memory 22 by the first processor 95 at the time $t_{22}$ goes to "1". At the time $t_{23}$, since the acknowledge and request signals ACK and REQ coincide again at "1", the first processor 95 sets the output $S_{RY}01$ at "1".

Assume that the first central processing unit 93 fails and over-run to set the first trip signal at "1" although no accident has occurred in the power system, thereby closing a first contact circuit 14 and setting the signals det0 to det3 at "1". FIG. 12 shows a timing chart in this case.

Operations of the first and second processors 95 and 96 at the times $t_{21}$ and $t_{11}$ are the same as those in FIG. 11.

Assume that the first central processing unit 93 fails at a time $t_{f2}$. At the time $t_{22}$, since the request and acknowledge signals coincide with each other at "0", the first processor 95 receives the signals det0 to det3 from the memory 22 as the signals $S_{RY}0$ to $S_{RY}3$. Since the signals det0 to det3 are "1" due to the failure in the first central processing unit 93, the signals $S_{RY}0$ to $S_{RY}3$ are naturally "1". However, processing of the second processor 96 is not performed at the time $t_{13}$ due to the failure in the first central processing unit 93. Therefore, at the time $t_{23}$, the acknowledge signal remains "0" whereas the request signal goes to "1", i.e., the two signals do not coincide with each other.

As a result, the first processor 95 sets all of the output signals $S_{RY}01$ to $S_{RY}31$ at "0". Therefore, since output signals from AND circuits 26 and 27 and an OR circuit 28 also go to "0", a second contact circuit 15 is not closed.

According to this embodiment as described above, although a delay of one sampling time is generated between the rise of the signals $S_{RY}0$ to $S_{RY}3$ and that of the output signals $S_{RY}01$ to $S_{RY}31$, sending of a false trip signal to a circuit breaker operating unit 18 caused by a failure in the first central processing unit 93 can be reliably prevented.

In each of the above first to fifth embodiments, in order to output the first trip signal from the accident determination section, determination signals of the first and second accident determination units 23a and 23b are ORed by the OR circuit 24 and output. However, the present invention is not limited to the above embodiments, but determination signals from all of the accident determination units or only a necessary number of determination signals may be ORed.

In addition, when some or all of the above embodiments are simultaneously practiced, sending of a false trip output to a circuit breaker can be prevented more reliably.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

We claim:

1. A digital protective relay apparatus for protecting a power system, comprising:

accident determining means, having first and second output terminals, for determining occurrence of an accident in said power system, which receives a voltage and a current of said power system from said power system to determine occurrence of an accident in said power system using the voltage and the current, outputs a determination signal via the first output terminal, the determination signal indicating occurrence/non-occurrence of an accident in accordance with a result of the accident determination, and outputs a first trip signal via the second output terminal upon detecting occurrence of an accident in said power system in accordance with the accident determination;

protections sequence means having an input terminal connected to the first output terminal and an output terminal, for determining necessity of a trip output, which receives the determination signal via the input terminal from said accident determining means to determine necessity of a trip output by performing predetermined sequence processing using the determination signal, said protection sequence means outputting a second trip signal via the output terminal of said protections sequence means upon obtaining a determination result indicating that a trip command is to be output; and trip generating means having first and second contact circuits respectively connected to the second output terminal of said accident determining means and to the output terminal of said protection sequence means, for generating a third trip signal for opening a circuit breaker provided to protect said power system when the first and second contact circuits are simultaneously closed in response to the first and second trip signals.

2. An apparatus according to claim 1, wherein said trip generating means includes first and second contact circuits inserted in series with each other between a power line and a ground line, first contact driving means for closing said first contact circuit upon receiving the first trip signal, and second contact driving means for closing said second contact circuit upon receiving the second trip signal, and a current flowing between said power line and the ground line when both of said first and second contact circuits are closed serves as the third trip signal.

3. An apparatus according to claim 1, wherein said accident determining means includes system state determining means for performing determination of a plurality of types of accidents using the voltage and the current and outputting determination signals corresponding to results of the determination, and means for outputting the first trip signal when a predeter-mined at least one of determination signal output from said system state determining means indicates occurrence of the accident.

4. An apparatus according to claim 3, wherein said accident determining means further includes memory means for storing the determination signals output from said system state determining means.

5. An apparatus according to claim 3, wherein said system state determining means includes at least two of an undervoltage relay element for outputting a determination signal indicating occurrence of the accident when a line voltage in said power system is not more than a reference value, an overcurrent relay element for outputting a determination signal indicating occurrence of the accident when a current value of a zero phase in said power system is not less than a reference value, a short-circuit distance relay element for calculating an impedance of said power system from the line voltage and the current value of said power system and outputting a determination signal indicating occurrence of the accident when the impedance is not more than a predetermined value, and a ground distance relay element for calculating the impedance of said power system from voltage and current values of each phase of said power system and a current of a zero phase thereof and outputting a determination signal indicating occurrence of the accident when the impedance is not more than a predetermined value.

6. An apparatus according to claim 1, wherein
said accident determining means includes system state determining means for performing determination of a plurality of types of accidents using the voltage and the current and outputting determination signals corresponding to results of the determination, means for outputting the first trip signal when a predetermined at least one of determination signal output from said system state determining means indicates occurrence of an accident, and memory means for storing the determination signals output from said system state determining means, and
said protection sequence means includes first "AND" processing means for outputting the second trip signal when a plurality of determination signals including at least two of the determination signals stored in said memory means, at least one of which is different from the determination signal used to output the first trip signal, simultaneously indicate occurrence of the accident.

7. An apparatus according to claim 6, wherein said first "AND" processing means includes a plurality of "AND" gates and an "OR" gate for receiving outputs from said "AND" gates to output a second trip signal.

8. An apparatus according to claim 6, wherein
said accident determining means includes first inverting means for inverting a plurality of determination signals output from said system state determining means and storing the inverted signals in said memory means, and
said protection sequence means includes second inverting means for inverting the inverted signals stored in said memory means to restore the original determination signals, and second "AND" processing means for fetching the determination signals obtained by inverting processing of said second inverting means and the determination signals stored in said memory means without going through said first inverting means in units of types of accident determination, and outputting an "AND" signal as a determination signal indicating occurrence of the accident to said first "AND" processing means only when both of each pair of the fetched determination signals indicate occurrence of the accident.

9. An apparatus according to claim 6, wherein
said accident determining means further includes coding means for coding the determination signals output from said system state determining means and storing the coded signals into said memory means, and
said protection sequence means further includes decoding means for decoding the coded signals stored in said memory means to restore the original determination signals, and third "AND" processing means for fetching the determination signals obtained by decoding processing of said decoding means and the determination signals stored in said memory means without going through said coding means in units of types of accident determination, and outputting an "AND" signal as a determination signal indicating occurrence of the accident to said first "AND" processing means only when both of each pair of the fetched determination signals indicate occurrence of the accident.

10. An apparatus according to claim 1, further comprising:
resetting means for outputting a reset signal at a predetermined period as long as at least said accident determining means normally operates, and
monitor timer means for outputting a over-run detection signal when said monitor timer means is not reset by the reset signal within a predetermined time interval.

11. An apparatus according to claim 10, wherein
said resetting means and said monitor timer means monitor an operation state of said accident determining means, and
said protection sequence means outputs the second trip signal when the determination signal indicates occurrence of an accident and said monitor timer means does not outputs the over-run detection signal.

12. An apparatus according to claim 6, wherein
said accident determining means further includes resetting means capable of outputting a reset signal at a predetermined period as long as said accident determining means normally operates, and monitor timer means for outputting a over-run detection signal when said monitor timer means is not reset by the reset signal within a predetermined time interval, and said protection sequence means further includes third inverting means for inverting and outputting the over-run detection signal from said monitor timer means, and fourth "AND" processing means for fetching the determination signals stored in said memory means in units of types of accident determination and the output signal from said third inverting means, and outputting, when the determination signals indicate occurrence of the accident and the output signal from said third inverting means does not indicate over-run, a determination signal indicating occurrence of the accident to said first "AND" processing means.

13. An apparatus according to claim 6, further comprising:

means for normally operating as long as said accident determining means normally operates, outputting an acknowledge signal in a first state upon receiving a request signal in the first state, and outputting an acknowledge signal in a second state upon receiving a request signal in the second state; and operation determining means for outputting the request signal and receiving the acknowledge signal, supplying the determination signals stored in said memory means to said first "AND" processing means when the states of the two signals coincide with each other, and stopping supply of the determination signals to said first "AND" processing means when the states of the two signals do not coincide with each other.

14. An apparatus according to claim 13, wherein when the states of the two signals coincide with each other and any of the determination signals indicate occurrence of an accident, said operation determining means compares the two signals again upon elapse of a predetermined time to check whether the two signals coincide with each other, and if the states of the two signals coincide with each other, said operation determining means supplies the determination signals to said first "AND" processing means.

* * * * *